United States Patent

[11] 3,606,995

[72] Inventor Nico Jacobus August van den Hemel
 Zevenaar, Netherlands
[21] Appl. No. 781,740
[22] Filed Dec. 6, 1968
[45] Patented Sept. 21, 1971
[73] Assignee Lever Brothers Company
 New York, N.Y.
[32] Priority Dec. 13, 1967
[33] Netherlands
[31] 6716919

[54] PROCESS AND APPARATUS FOR THERMALLY TREATING FLEXIBLE CONTAINERS
 5 Claims, 6 Drawing Figs.

[52] U.S. Cl. .................................................. 21/2,
 21/56, 21/92, 21/94, 21/105, 99/214, 99/249, 99/361
[51] Int. Cl. ................................................. A61l 3/00
[50] Field of Search .......................................... 21/78, 79,
 80, 2, 56, 93–98, 105; 99/369, 367, 361, 249, 214;
 263/2, 6, 8

[56] References Cited
 UNITED STATES PATENTS

| | | | |
|---|---|---|---|
| 1,209,619 | 12/1916 | Rea et al. .................... | 99/367 X |
| 1,695,224 | 12/1928 | Besta .......................... | 263/6 |
| 1,953,656 | 4/1934 | Mullen ....................... | 99/214 |
| 1,986,115 | 1/1935 | Offenhauser ............... | 99/369 X |
| 2,154,978 | 4/1939 | Galvin ........................ | 99/361 |
| 2,338,258 | 1/1944 | Ray ............................ | 198/143 |
| 2,386,676 | 10/1945 | French ....................... | 21/56 |
| 2,549,216 | 4/1951 | Martin ........................ | 99/182 |
| 2,862,822 | 12/1958 | Whitmore .................. | 21/80 X |
| 3,058,177 | 10/1962 | Taylor et al. ............... | 21/79 |
| 3,122,990 | 3/1964 | Fried .......................... | 99/369 |
| 3,252,405 | 5/1966 | Mencacci ................... | 99/369 X |
| 3,437,422 | 4/1969 | Guckel ....................... | 21/80 |
| 3,481,688 | 12/1969 | Craig et al. ................. | 21/94 X |

FOREIGN PATENTS

| | | | |
|---|---|---|---|
| 1,178,379 | 12/1958 | France ....................... | 21/93 |
| 320,532 | 6/1913 | Germany .................... | 99/367 |

*Primary Examiner*—Joseph Scovronek
*Assistant Examiner*—D. G. Millman
*Attorney*—Louis F. Kline, Jr.

ABSTRACT: A process and apparatus for the sterilization or other thermal treatment of hermetically sealed containers, the process being carried out continuously and in a manner which compensates for increased pressure within the containers.

INVENTOR
NICO JACOBUS AUGUST VAN DEN HEMEL
BY
his AGENT

PROCESS AND APPARATUS FOR THERMALLY TREATING FLEXIBLE CONTAINERS

The invention relates to a process for the sterilization or other thermal treatment of products in hermetically sealed containers, to an apparatus for carrying out this process and to the products treated according to the process.

If products, after being filled into containers and after the subsequent hermetical sealing of the containers, are to be subjected to thermal treatments, e.g. to a sterilization process and, if necessary, to a subsequent cooling, it should be taken into account that during the thermal treatments underpressure or overpressure may build up in the interior of the containers. It may then occur that the material of which the containers are made, or the hermetical seals of the containers as such do not sufficiently resist these internal pressures. The material meant here may be e.g. aluminum foil, which on the inside but also on the outside may have a plastic coating. However, the container may also entirely consist of plastic material. The hermetical sealing of the containers may be effected e.g. by means of a heat-sealing process.

It is known to sterilize this type of containers by introducing them batchwise into and autoclave, in which case the compensating pressure for retaining the shape of the containers and/or keeping the closures sealed is obtained by either clamping the containers in supporting moulds or giving the sterilization medium so much over pressure that the latter more or less counterbalances any pressure building up in the interior of the containers. In this sterilization of containers it often occurs that the sterilization conditions are not uniform throughout the autoclave.

It is the object of the invention to provide a simple method for carrying out the thermal treating process continuously and by which a significantly uniform treatment of the containers with products can be obtained.

Accordingly the invention provides a process for the thermal treatment of products in hermetically sealed containers, comprising passing the containers as a train of mutually contacting units through an open-ended tube, subjecting the containers to a thermal treatment while within said tube and compensating for increased pressure in the containers due to heat. Conveniently said units are constituted by supporting moulds carrying the containers and the increased pressure is compensated at least partly by these supporting molds during the thermal treatment. As an alternative the units may be constituted by the containers alone.

Preferably the units are a close fit in the tube and the increased pressure may be compensated at least partly by using, for the thermal treatment, a treatment medium which is applied to the containers under a pressure greater than that within the containers. The containers will be in the form of a train of mutually contacting units, e.g. as a stack, with each of the units closely fitting to the tube walls, although not so tightly as to restrict movement of the units or flow of the treatment medium. However the fact that the treatment medium would have to pass a significant number of these units before coming to the end of the tube constitutes an effective seal of the treating medium from the open air; this may be referred to as a quasi-labyrinth seal. As a result of this combination of measures i.e. reciprocal pressure of the containers and/or the supporting molds on each other and over pressure of the treating medium, the compensating pressure can be accurately matched to the internal pressure building up within the containers during the thermal treat process.

When the containers have edge seals it is preferable these are gripped by supporting molds during the thermal treatment, this minimizes the risk of these edge seals bursting during the treatment.

The most efficient way of carrying out the process is when the containers are conveyed through a thermal treatment apparatus in which the tube is substantially vertical and the units are passed through the tube as a vertical stack whose weight at least partly provides a force to compensate for the increased pressure within the containers.

An apparatus for carrying out the invention may comprise an open ended tube, transfer means for passing the containers as a train of mutually contacting units sequentially through the tube, and heat supply means which is arranged to supply a heat treatment medium to the interior of the tube so as to apply a heat treatment to the containers as they pass through the tube. Conveniently the tube may have one or more treatment zones e.g. for heating and cooling the containers disposed along its length. In one form of the apparatus, the transfer means is a conveyor having a horizontal flight which passes within said tube and has a series of vertically upstanding molds attached thereto which are arranged to press the containers together to form a train of mutually contacting units during their passage through said tube so as to compensate for increases in pressure within the containers due to heat.

In a preferred form, however, the tube is substantially vertical and the apparatus comprises a series of molds to accommodate said containers when arranged at a vertical stake within said tube, the molds being arranged to compensate for any increase in pressure within the containers due to heat.

Preferably said tube comprises a cylindrical jacket which communicates with the interior of the tube and is adapted to accommodate a heating medium, such as steam, for thermal treatment of the containers as they pass through the tube. Two separate heat supply means may be provided for supplying the heat to the interior of the tube, the first being to heat and sterilize the containers and the second to subsequently cool them.

In manufacturing the apparatus in accordance with the invention, it is convenient to provide a single apparatus for treating containers of various sizes the apparatus being of standard dimensions giving a cross section which is capable of accommodating the largest container to be treated, and providing various different sizes of support molds each of which closely fit within the tube but which accommodate the different sized containers.

The invention will now be further elucidated from the accompanying drawing, in which:

FIGS. 1a and 1b give a diagrammatic side view of an apparatus for carrying out the process according to the invention, provided with a conveyor;

Figure 5:
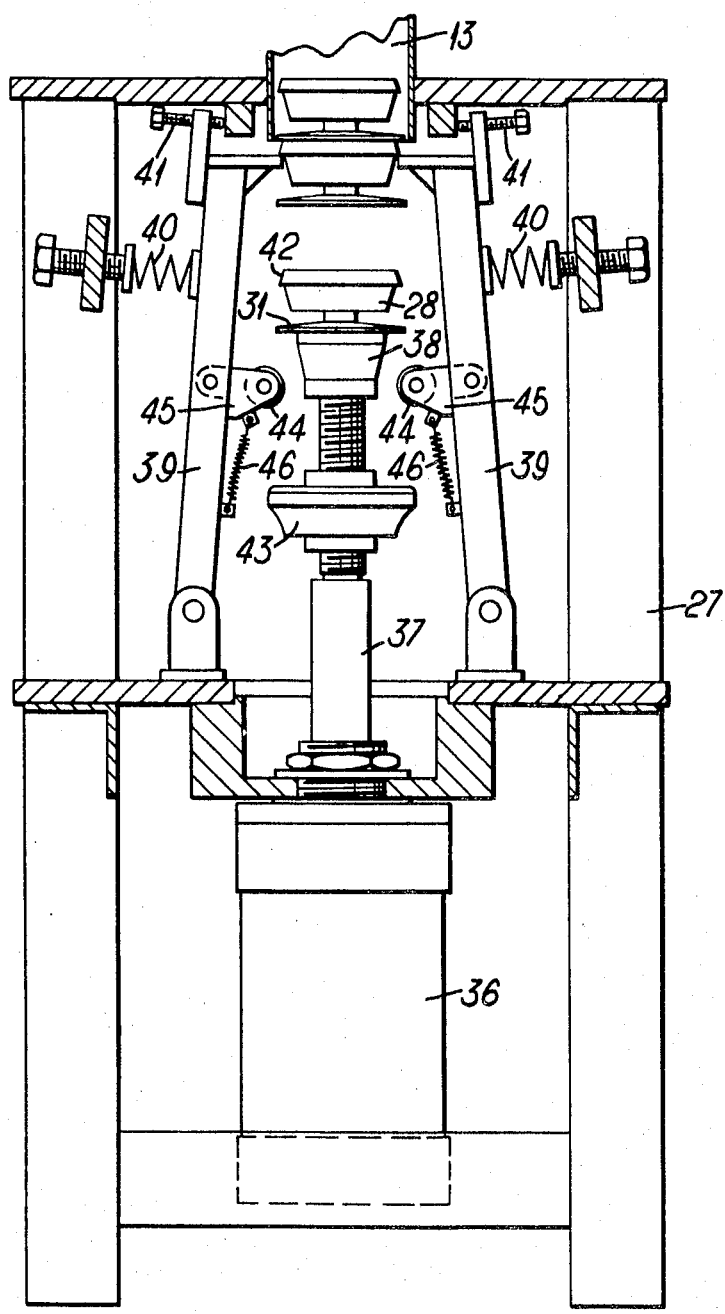

FIG. 5 diagrammatically shows a discharge device.

Figure 1A:
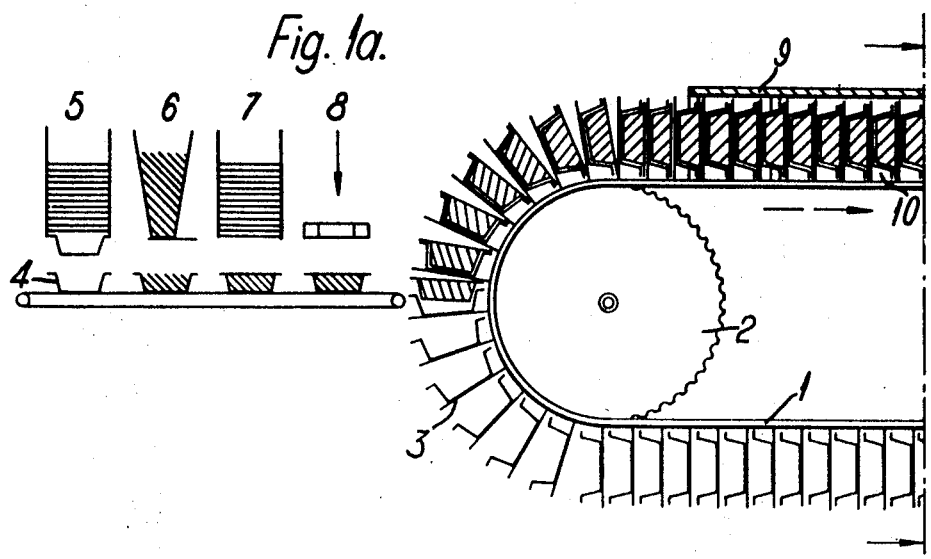
Figure 1B:
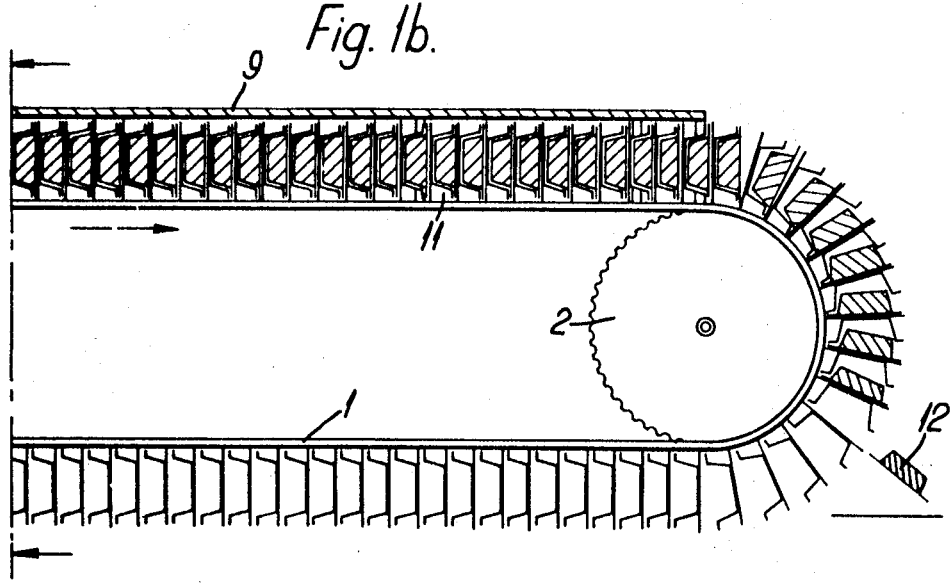

FIG. 1 gives a side view of an apparatus for carrying out the process according to the invention, fitted with a conveyor 1. This conveyor is driven in the direction of the arrow by means of chain wheels 2 and is provided with a large number of successive carriers, to which supporting molds are attached in such a way as to closely fit together in the horizontal sections of the conveyor. When the conveyor passes around the two chain wheels 2, the supporting molds are somewhat forced apart, which enables the operator to feed and discharge the containers to be treated and the treated containers, respectively. It is diagrammatically indicated how the containers 4 are fed from a stock 5 on a conveyor, subsequently filled at 6, provided with a lid a 7, and hermetically sealed at 8, e.g. by heat-sealing.

The containers thus filled and hermetically sealed are subsequently taken up in the conveyor, which with its carriers and the supporting molds allows the prepared containers to be introduced near the chain wheel 2 (shown to the left). The supporting molds, closely fitting together and carrying the containers to be treated, subsequently come into the open ended tubular channel 9, in the horizontal top section of the conveyor, in which channel the thermal treatments take place. The supporting molds, carrying the containers, support each other completely and have such an external shape as to substantially shut off the open treatment channel 9 from the atmosphere. The treatment channel has a sterilization space 10 and a cooling space 11. The sterilization medium may e.g. be pressurized steam or pressurized water, at temperatures suitable for sterilization, the cooling medium mostly being water. After leaving the open treatment channel, the discharge of the treated container may take place near the other chain wheel 2 of the conveyor, as indicated with the treated container 12.

Figure 2:
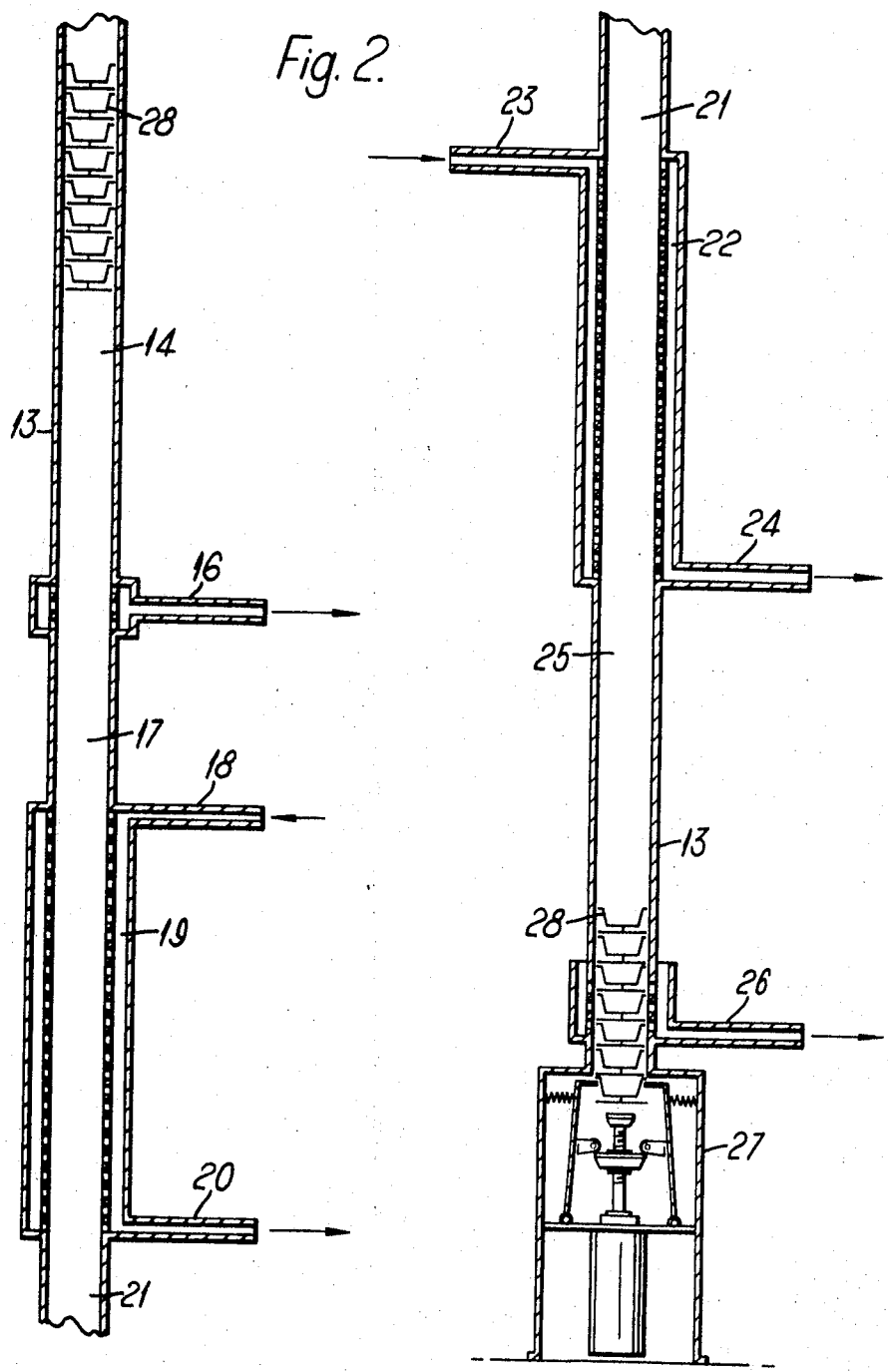
FIG. 2 is a diagrammatical representation of the preferred embodiment of the apparatus according to the invention, drawn in two sections.
Figure 3:
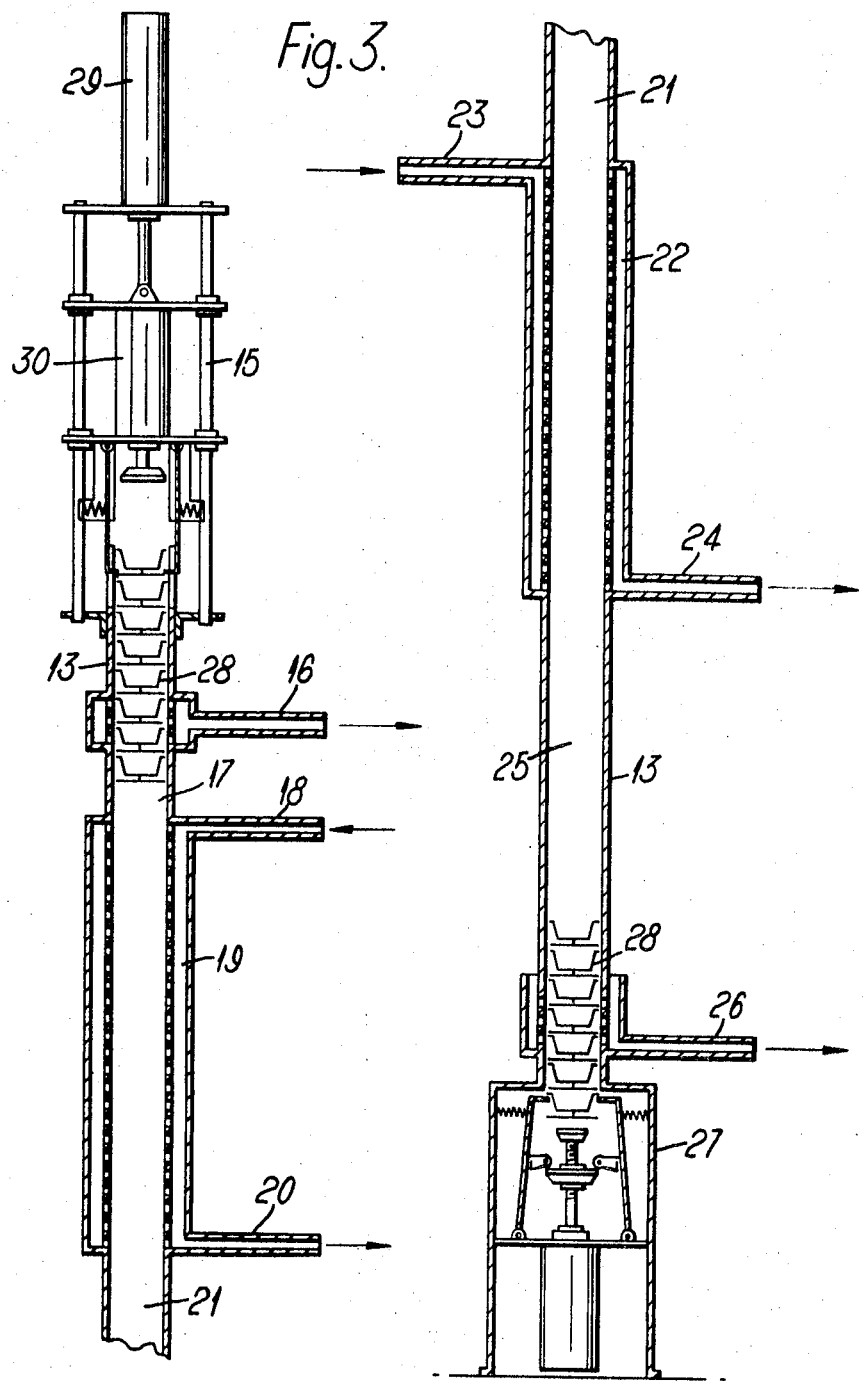
FIG. 3 is an identical diagrammatical representation as FIG. 2, in which the apparatus is fitted with a feeding device, which is at the same time a pressing device.

FIGS. 2 and 3 diagrammatically show the preferred embodiments of the apparatus according to the invention. The open treatment channel is vertical here and may e.g. be shaped as a cylindrical tube 13. If, as shown in these figures, the treatment of the containers is effected by feeding them at the top and discharging them at the bottom after the treatment, the following sections can roughly be observed on the sterilization apparatus, viewed from top to bottom:

A mechanism for feeding the containers to be treated (not shown); a pressure building section 14, or a pressure mechanism 15, respectively; a secondary outlet 16 for any treating medium leaking through the subsequent sealing section 17 e.g. steam or water); an inlet 18 of the treating medium; the thermal treatment space proper 19; the main outlet 20 of the treating medium; if necessary, a sealing section 21 between the treatment space 19 and the cooling space 22; the inlet 23 for the cooling medium; the main outlet 24 for the cooling medium; a sealing section 25 for the cooling medium a secondary outlet for any cooling medium still leaking through; and a discharge mechanism 27 for the treated containers. For clarity's sake, in FIGS. 2 and 3 a number of (empty) supporting molds 28 are only shown in the top and bottom sections of the tube 13, but they of course fill the whole tube 13 from top to bottom together with the containers to be treated therein as a train of mutually contacting units.

Dependent on the weight of the filled containers and of the supporting molds, it is possible, as indicated in FIG. 1, to pile so many containers and supporting molds to top of each other in the secton 14 of the tube 13 that the containers present in the treatment space 19 exert sufficient force on each other to counterbalance the pressure building up in the interior of the container as a result of the thermal treatment. If the weight of the containers and/or supporting moulds is small, the necessity would arise to make the column above the treatment space 19 extremely long. In that case it is preferred to use a pressing mechanism 15 instead of the pressure-building section 14 that would be unmanageably long. This pressing mechanism, which is shown in more detail in FIG. 4, functions in such a way that the pressure is no interrupted when a new supporting mold with container is added to the series already present in the channel.

The mechanism consists of two compressed air cylinders 29 and 30. The upper one (29) serves to supply a constant, adjustable pressure on the column of containers/supporting molds, whereas the other one (30) serves to temporarily displace the point of application of this pressure on the column from the center line of the supporting molds 28, which at a given moment is the topmost in the column, to an edge 31 provided for this purpose on the bottom side of the supporting mold. This is necessary to permit the feeding of the next supporting mold with container.

Figure 4:
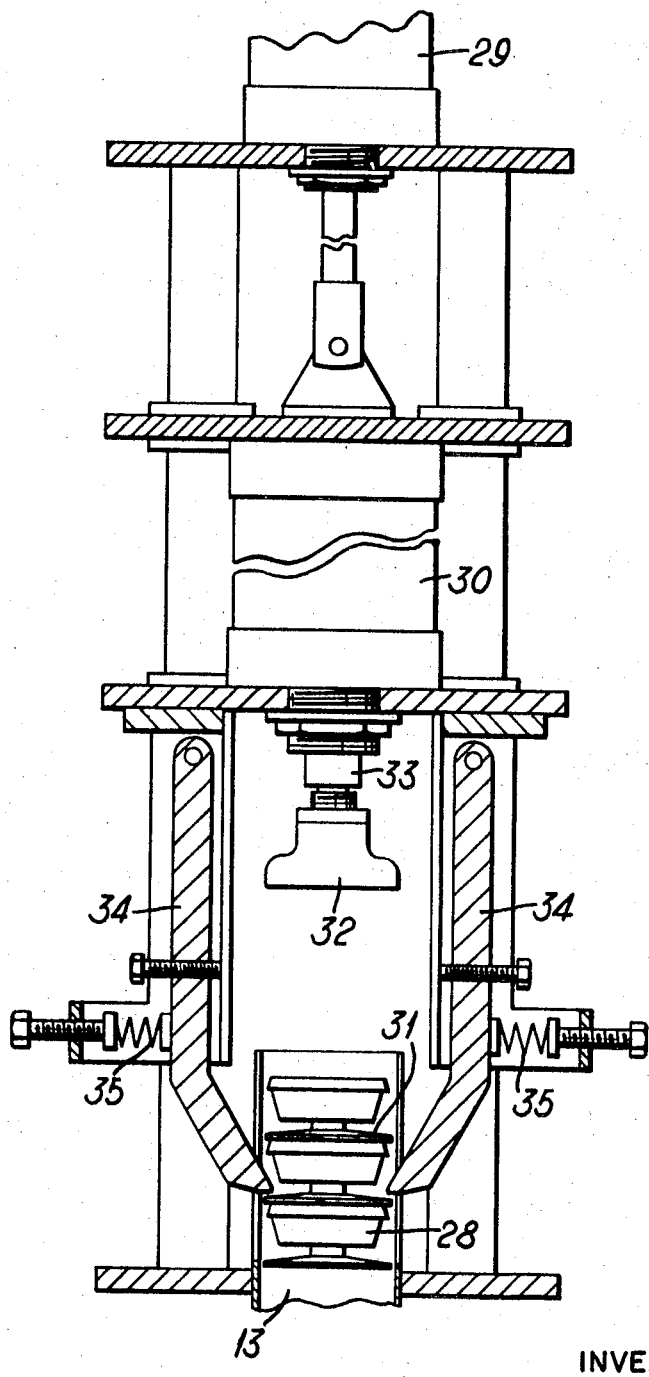
FIG. 4 shows a feeding and pressing device in detail.

In FIG. 4 it is shown that the pressure on the column of containers and supporting molds can be transmitted either by the head 32, mounted on the piston rod 33 of the air cylinder 30, viz. in the center of the column or via tow pawls 34 on the edge 31 of the topmost supporting mold 28 present in the treatment channel. In the latter position of the pawls 34 the head 32 is moved upwards by the piston rod 33, so as to make room for feeding a supporting mold with container by the feeding mechanism. The latter may be done in a number of ways, which are not connected with the invention; the feeding mechanism, therefore, is not shown.

If the piston rod 33 subsequently moves the head 32 downwards, the latter comes to press on the freshly supplied supporting mold with container and at that moment takes over the pressure from the pawls 34. The pawls 34 are now drawn upwards by the rising air cylinder 30, and pressed outwards by the second topmost supporting mold, against the action of the adjustable springs 35. They engage behind the bottom edge 31 of the freshly supplied topmost supporting mold 28. When, on discharging the lowermost treated container, the discharge mechanism 27 at the bottom of the column of supporting molds/containers present in the treatment channel 13 permits this, the entire column with the head 32 pressing on it moves one position downwards. If subsequently the head 32 is again moved upwards by the piston rod 33, the pressure is transmitted to the bottom edge 31 of the last-supplied topmost supporting mold 28 via the pawls 34.

The discharge mechanism 27 shown in more detail in FIG. 5 shows the following parts: a compressed air cylinder 36, fitted with a piston rod 37 having a head 38 at its end. Two pawls 39 are hingedly connected to the frame 27 of the discharge mechanism, which pawls are pressed in their innermost position by adjustable springs 40. The innermost position is limited by two adjusting screws 41 in such a way that in this position the pawls 39 can engage under the top edge 42 of the lowermost supporting mold 28 present in the column of supporting molds and containers (see FIG. 5).

On the piston rod 37 a delatching disc 43 is mounted, which is vertically adjustable and which, when the piston rod 37 is moved, cooperates in the way to be described below with delatching cams 45, hinged to the pawls 39 and provided with rollers 44. The column of supporting molds with containers present in the treatment channel 13 is carried by the pawls 39. For removing the lowermost supporting mold with treated containers from the column, the piston rod 37 is raised. The delatching disc 43 now abuts against the rollers 44, as a result of which the delatching cams 45 will tilt upwards around their hinge points. Except for the fact that the springs 46 are thus tensioned, this tilting has no further influence on the position of the pawls 39. The piston rod 37 moves upwards until the head 38 abuts against the bottom of the lowermost supporting mold, and the column of supporting molds and containers as a whole is slightly lifted. At this moment the section with the largest diameter of the delatching disc 43 has passed the rollers 44, and the delatching cams 45 will snap back to the position shown in FIG. 5 under the action of their springs 46. The piston rod 37 is now moved downwards, carrying along the entire column of supporting molds/containers resting on it, as a result of which the delatching disc 43 abuts against the rollers 44. Since the delatching cams 45 cannot tilt downwards any further, the pawls 39 will not hinge outwards. The top edge 43 of the lowermost supporting mold 28 present in the column and the edge 31 provided on the underside of the next supporting mold will now pass the pawls 39. At this moment the section with the largest diameter of the delatching disc 43 has passed the rollers 44, and the pawls 39 will again return to their innermost position under the action of their springs 40, engaging under the top edge 42 of the next supporting mold in the column. The whole column now comes to rest again on the pawls 39, whereas the supporting mold with treated container, removed from the column, rests on the head 38. After the piston rod has been moved further downwards, this supporting mold can be removed in a suitable manner from the discharge device 27.

It will be evident that for obtaining a good performance of the apparatus the pressing and discharge mechanisms shown in the drawing will have to be adjusted to each other.

What is claimed is:

1. A process of thermally treating filled containers which have an edge seal and flexible walls comprising
    i. locating each container within a mold support unit which grips the edge seal and has supporting surfaces to provide support of the walls of the container against thermal expansion,
    ii. feeding said mold support onto and end of a progressing train of mutually contacting similar units, said supporting molds exerting a reciprocal pressure on each other, iii. conducting said unit, while in said train, into an open ended tube in which each of said units closely fits to the walls of said tube, iv. progressively passing said unit through at least one thermal treatment zone within said tube, v. subjecting said unit to a gaseous thermal treatment while maintaining pressure on said train to grip said edge seal, the pressure of said gaseous thermal treatment combining with said reciprocal pressure to compensate for pressure changes within said container during said thermal treatment, and vi. passing said unit out of the other end of said tube and removing said unit from the other end of the train.

2. A process according to claim 1, in which the units are a close fit in the tube and the increased pressure in compensated at least partly by using, for the thermal treatment, a treatment medium which is applied to the containers under a pressure greater than that within the containers.

3. A process according to claim 1, in which said tube is substantially vertical and the units are passed through the tube as a vertical stack whose weight at least partly provides a force to compensate for the increased pressure in the containers.

4. An apparatus for thermal treatment of filled containers having an edge seal comprising i. a set of mold support units each of which is arranged to carry a sealed container, and has supporting surfaces to provide support of the walls of the container against thermal expansion, and means for gripping the edge seal of said container, ii. an open ended tube designed for the passage therethrough of a train of mutually contacting units, iii. transfer means for passing the units through the tube while closely fitting to the walls thereof, iv. heat supply means which is disposed to supply a gaseous heat-treatment medium to the interior of the tube thereby to apply a heat treatment to the containers as they pass through the tube, and v. means for applying pressure to said train of contacting units so that during the heat treatment the edge seals are gripped under pressure to maintain the seals during the thermal treatment.

5. Apparatus according to claim 4, in which the transfer means is a conveyor having a horizontal flight which passes within said tube and has a series of vertically upstanding molds attached thereto which are arranged to press the containers together during their passage through said tube so as to compensate for increases in pressure within the containers due to heat.